July 19, 1932.　　　G. A. SWARTZ　　　1,868,082
POWER STEERING MECHANISM FOR MOTOR VEHICLES
Filed Sept. 13, 1930　　2 Sheets-Sheet 1
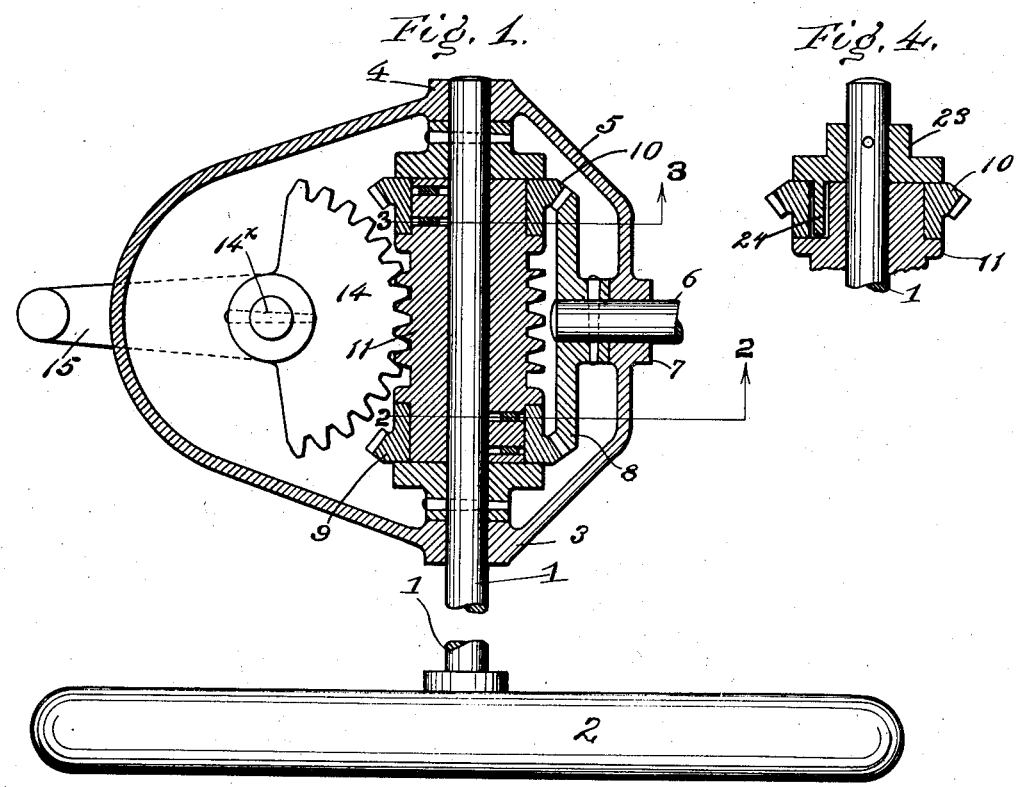
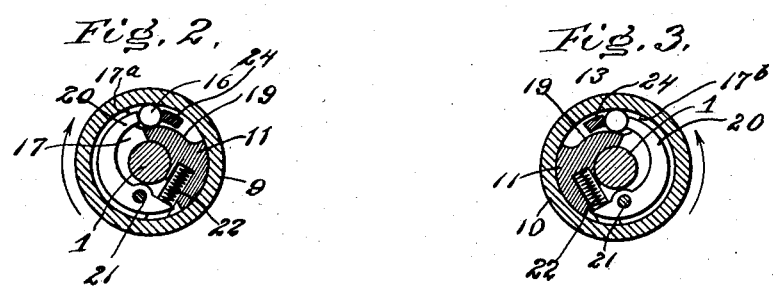

July 19, 1932. G. A. SWARTZ 1,868,082
POWER STEERING MECHANISM FOR MOTOR VEHICLES
Filed Sept. 13, 1930  2 Sheets-Sheet 2
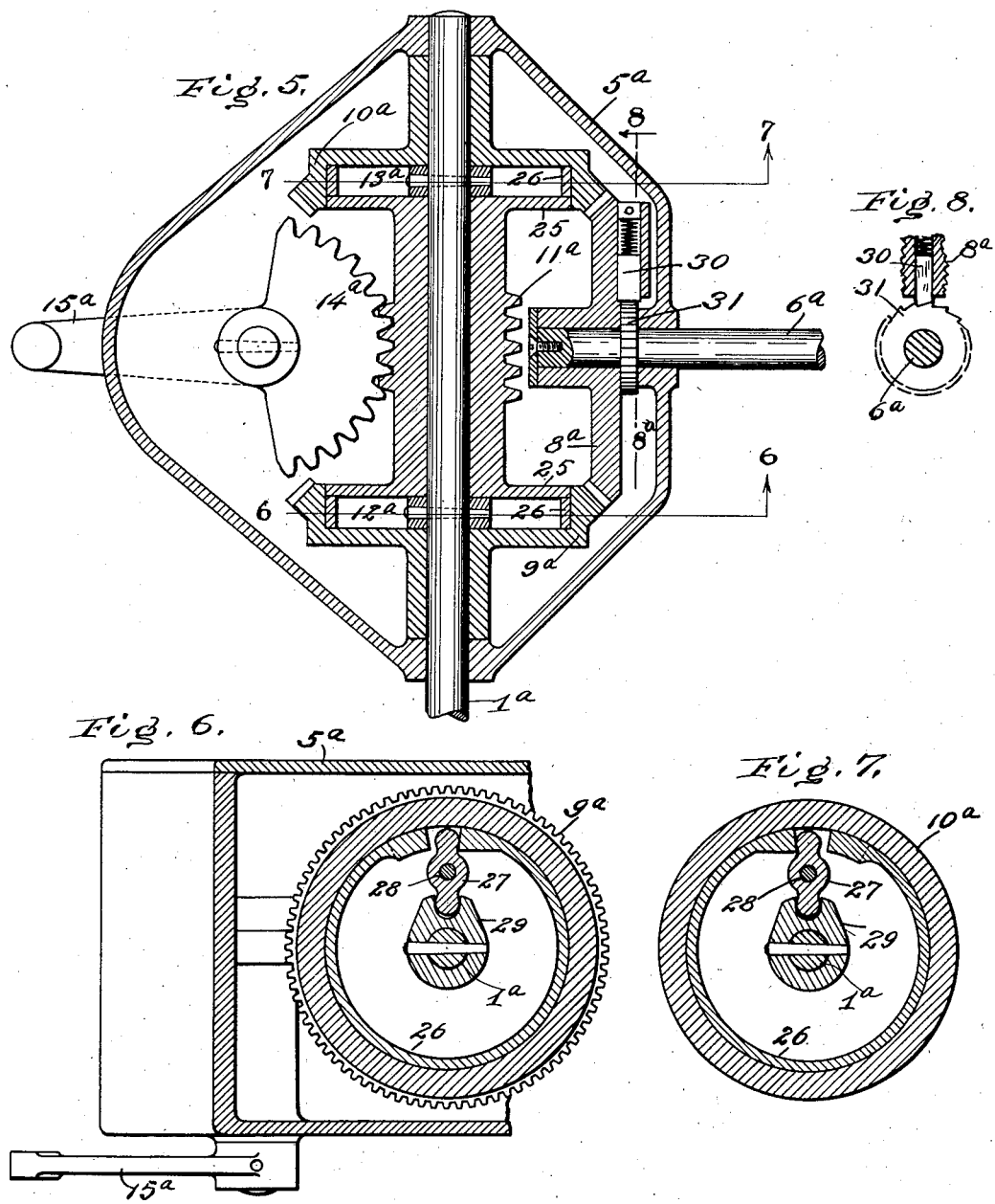

Patented July 19, 1932

1,868,082

UNITED STATES PATENT OFFICE

GEORGE A. SWARTZ, OF WESTWOOD, NEW JERSEY

POWER STEERING MECHANISM FOR MOTOR VEHICLES

Application filed September 13, 1930. Serial No. 481,673.

This invention relates to power steering mechanism for motor vehicles, such as automobiles, and is concerned more particularly with that type of power steering mechanism in which the application of the power of the driving engine to the steering mechanism, and the control of the same, is effected by the turning of a hand steering wheel by the driver.

The objects of the invention are to produce a power operated steering mechanism of this type, of simple, effective and economical construction, in which the driver will have at all times complete control of the application of the power to the steering ground wheels; which mechanism may be operated to steer by hand, when, in case the vehicle is running slowly and occasion arises to turn the steering ground wheels quickly; which will be operable when the engine is not running, to turn the steering ground wheels by hand, as heretofore; and in which the steering ground wheels when set in any particular position by the actuation of the power means, or solely by the hand of the driver, will be locked in the position set, and thus prevent idle movement of said wheels.

With these and other objects in view, the invention consists of the improved arrangement and construction of parts, which will be described in detail in the specification to follow, and the novel features of which will be set forth in the appended claims.

In the accompanying drawings:

Fig. 1 is a sectional plan view of the gearing between the power means and the steering mechanism showing the relation of the steering post thereto, and showing how the same is controlled in accordance with my invention;

Fig. 2 is a cross section on the line 2—2 of Fig. 1, as viewed in the direction of the arrow on said line, and showing one of the clutches for controlling the operation of the actuating worm in one direction;

Fig. 3 is a similar view on the line 3—3 of Fig. 1, as viewed in the direction of the arrow on said line, and showing the other clutch for driving the worm in the opposite direction;

Fig. 4 is a sectional view of a detail of the improved mechanism, showing how the clutches are controlled from the steering post;

Fig. 5 is a view similar to Fig. 1, of a modification of the invention;

Fig. 6 is a cross section on the line 6—6 of Fig. 5, as viewed in the direction of the arrow on said line;

Fig. 7 is a similar view on the line 7—7 of Fig. 5, as viewed in the direction of the arrow on said figure; and Fig. 8 is a sectional elevation on the line 8—8 of Fig. 5.

Referring to the drawings:

Referring particularly to Figs. 1 to 4, the numeral 1 designates a steering post or shaft having on its upper end a hand steering wheel 2 for turning it, and mounted in suitable upper and lower bearings 3 and 4 in a casing 5 sustained fixedly in any suitable manner by the body of an automobile in front of the driver's seat. A power member in the form of a driving shaft 6, driven in any suitable manner from the engine (not shown) has its end journalled in a bearing 7 on the casing, and its terminal portion extends some distance into the casing. Fixed to the terminal portion of this shaft, is a bevelled gear 8 which engages and drives, respectively in opposite directions, two bevelled pinions 9 and 10 journalled to turn freely on the opposite ends respectively of an actuating worm 11 mounted loosely on the steering shaft or post 1, which bevelled pinions are adapted to be clutched to said worm by means of clutches 12 and 13 in the manner presently to be described, so as to rotate said worm respectively in opposite directions. The motion of the worm is transmitted to a toothed driven member in the form of a worm segment 14 mounted in suitable bearings in the casing on an axis 14$^x$ extending at right angles to the axis of the worm, and carrying an arm 15 which extends outside the casing and is operatively connected with the steering wheel knuckles (not shown) of the automobile, by the usual and well known connections, not necessary to here show or illustrate for a proper understanding of the invention.

The clutches 12 and 13 are identical in form and operation, and only differ as to their arrangement with respect to the steering shaft 1, one clutch being arranged to be operated when the steering post is turned in one direction, and the other when the post is turned in the opposite direction, and therefore, a detailed description of one of said clutch mechanisms will suffice.

The clutch comprises a clutch roller 16 which is located in a recess 17 formed in the end of the worm, which recess extends partially around the worm, leaving a solid intact portion 11ª thereof, as best shown in Figs. 2 and 3, which recess and intact portion of the worm are surrounded by the hollow hub of the bevelled pinion 9 or 10, as the case may be. At one end, the recess 17 is contracted, as the side surface 19 of the intact portion of the worm gradually approaches the inner surface of the surrounding hub of the pinion, and when the clutch is to be connected, the roller 16 is forced into this contracted end of the recess and is wedged in between the surface 19 and surrounding pinion, thereby clutching the pinion to the worm and transmitting the motion of the pinion thereto; and when the clutch is to be disconnected, the roller is forced in the opposite direction out of wedging relation with the surface 19 and surrounding pinion, and the latter will then rotate without transmitting its motion to the worm.

The roller is forced in a direction to engage the clutch by fingers 20, 20 extending circumferentially in said recess 17 and pivoted between their ends as at 21 to the worm, one of the ends of the fingers being in a position to engage the roller so as to force the same into the contracted end of the recess and thus engage the clutch, and the other ends of the fingers being acted on by spiral expansion springs 22 seated in cavities in the worm, which springs tend to rock the fingers on their axes in a direction to connect the clutch. These movements of the roller for connecting and disconnecting the clutch are controlled by the turning of the steering post 1 by the hand steering wheel 2, the said post having fixed to it for this purpose, a collar 23 (there being two of these collars, one for each clutch) located between the shaft bearing and the end of the worm, which collar has projecting inwardly from it, an axial finger 24, extending into the contracted portion of the recess 17 in position to engage that side of the roller 16 opposite where it is engaged by the fingers 20, as shown in Figs. 2 and 3.

As a result of this form and arrangement of the parts, it will be understood that when the finger 24 is moved in one direction, by the corresponding movement of the hand steering wheel 2, for instance to the right in Fig. 2, the pressure on the roller 16 being relieved, the latter will be forced by the spring actuated fingers into the contracted portion of the recess, and the clutch will be connected; and when the wheel is turned in the opposite direction, the finger 24 engaging the roller, will force it out of wedging engagement with the walls of the recess, and the clutch will be disconnected.

It will also be understood that there being two clutches of the form described, oppositely arranged, and operated in the manner just described, by the respective fingers on the collars 23 at opposite ends of the worm, the driver may by turning the hand wheel in one direction, connect one clutch and disconnect the other, whereby the worm will be turned in one direction by one of the power driven bevelled pinions, and by turning the hand wheel in the opposite direction, these operations being reversed, the worm will be rotated in the other direction by the oppositely rotating driving pinion.

As before described, the motion of the actuating worm 11 is transmitted to the worm wheel or segment 14, and by it to the steering ground wheels, turning the same by power to the right or left, according to the direction of turning of the hand steering wheel by the driver; and in this action under a given speed of the engine, the steering of the vehicle may be effected as slowly and gradually as desired by a "nursing" action of the fingers 23 on the clutch rollers, first releasing a roller and then forcing it into gripping engagement with the surrounding pinion, in gentle and quickly recurring following up movements. Furthermore, due to the fact that the turning of the hand steering wheel in either direction, will simultaneously connect one clutch and disconnect the other, it is possible, in the event that the engine is running slowly and occasion arises to effect a sudden or quick turn of the wheels, as in the case of an emergency, to operate the mechanism so as to turn the ground steering wheels independently, and ahead of the power means. For instance, assuming that the engine is running slowly, with the pinion 9 rotating in the direction shown by the arrow in Fig. 2, and it is desired to turn the ground wheels suddenly and faster than the same would be turned by power under the slow speed of the engine, the driver by rotating the hand steering wheel quickly to the right, will, by moving finger 24 to the right, (which would tend to connect pinion 9 to the worm), at the same time move the finger of the other clutch in the same direction, but with the result, under the reversed arrangement of the clutches, that its roller will be forced against an abutment wall 17ᵇ of recess 17 of the worm, the latter will be caused to rotate to the right, thereby turning the steering ground wheels in the same direction by hand that they would have been turned by the power means under the action of pinion 9, the motion of the parts in this hand operation overtaking the motion as transmitted by the power means. Of course the same result may be accomplished in the turning of the vehicle in the opposite direction, in which action the abutment wall 17ª of the other clutch would be utilized.

It is seen from the foregoing that there is an operative connection between the steering hand wheel and the actuating worm, through the medium of the clutches, independent of the power means for operating the worm; hence the ground steering wheels may be turned by my improved gearing while the engine is at rest. In other words, it is not necessary to operate the engine, in order to steer the vehicle.

Another and important advantage of the construction described, resides in the fact that by the use of the power actuated worm to transmit motion to the steering mechanism through the medium of the segment gear or worm wheel, which is engaged directly by the worm, the motion of the worm wheel under the influence of the idle movements of the steering ground wheels, cannot be transmitted to the worm to turn the same, the effect of this condition being to lock the steering wheels in the particular position in which they may be adjusted by the driver. In driving the vehicle in a straight path therefore, there is no danger of turning or deviation from said path by the idle or accidental turning of the steering ground wheels, since the worm cannot be turned by any motion of the engaged worm wheel or segment gear, and the latter is therefore locked by the worm.

In Figs. 5, 6 and 7, the invention is shown in modified form, the difference being mainly in respect to the specific form of the clutches, which in this form of the invention are of the expansible ring type, instead of the wedging roller type as in the form of the invention first described.

As shown in Fig. 6, the steering post or shaft 1ª is as before, mounted in bearings in a casing 5ª, and a power shaft 6ª carries a bevelled gear 8ª inside the casing, which gear drives two bevelled pinions 9ª and 10ª respectively in opposite directions, the said pinions being mounted to turn freely on the steering shaft at its opposite ends. The actuating worm 11ª is rotatably mounted on the shaft 1ª between the two pinions, and is adapted as before, to be clutched to either of the two oppositely moving pinions by two clutch mechanisms 12ª and 13ª, which in this form of the invention are of the construction shown in detail in Figs. 6 and 7. On reference to these figures, it will be seen that each end of the worm is extended radially in the form of a disc or flange 25, to which is fixed one end of a split expanding spring ring 26, and the two bevelled pinions 12ª and 13ª are recessed on their inner faces and house said expansible rings, so that when a ring is expanded, it will, by engaging the surrounding bevelled pinion, be gripped thereto, and the motion of the pinion will be transmitted to the ring, and thence to the worm; and when the spring ring is contracted, it will disengage from the surrounding pinion, and the latter will be permitted to rotate without affecting the worm, the form and relation of these parts being such that normally the spring rings are in contracted condition, free of engagement with their respective associated pinions.

The spring rings are expanded to thus connect the clutches, by the turning of the steering hand wheel in one direction or the other, by means of rocker dogs 27, which dogs are pivoted between their ends as at 28 to the outer ends of the worm 11ª, and have their inner ends rounded and engaged loosely in open sockets in lugs 29 pinned to the shaft 1ª within the respective expansible rings, and have their outer ends rounded and extend between the split ends of the respective rings.

It will be understood that the two clutches are arranged in reversed positions relative to each other, as shown in Figs. 6 and 7, where it will be seen that the free end of the expanding ring of the clutch shown in Fig. 6 is on the right hand side of the associated rocker lever 27, while the free end of the spring ring of the clutch shown in Fig. 7, is on the left hand side of its associated rocker lever, such reverse arrangement of the parts of the clutches being similar generally to the arrangement of the clutches 12 and 13 of the first form of the invention described.

In the operation of the parts described, and assuming that the pinion 9ª is rotating anti-clockwise, as shown by the arrow in Fig. 6, and the pinion 10ª is rotating in the opposite direction, as indicated in Fig. 7, and it is desired to turn the steering ground wheels to the left, the steering hand wheel on shaft 1ª is turned in a corresponding direction, which action will rock lever 27 of clutch 12ª, so as to expand the associated spring ring and cause it to grip the surrounding pinion 9ª, thereby clutching the pinion to the worm and driving the latter in the same direction as the pinion, and turning the steering ground wheels accordingly. In this action of the parts, the rocking lever 27 of the other clutch is operated to disengage the free end of its expanding ring, thereby disconnecting the clutch and permitting the pinion 10ª to rotate without affecting the worm.

To turn the ground steering wheels in the opposite direction, the hand wheel is turned to the right, and the foregoing operations being reversed, the worm will be rotated clockwise, and the ground steering wheels will be turned to the right.

In this modified form of the invention, all of the advantages described in connection with the form of the invention first described, will be realized, for as before, the mechanism may be operated to turn the ground wheels quickly when the engine is running at less speed than necessary to make the turn as speedily as desired; and the steering mechanism may be operated by hand independently of the power means, and it may be operated while the engine is not running; and also, as before, the ground steering wheels are locked in the position in which they may be set by the hand steering wheel, and the vehicle will travel in a straight path, without deviation therefrom by the accidental or idle motions of the steering ground wheels.

As shown in Fig. 5, the bevelled gear 8ª is not fixed rigidly to the end of the power operated shaft 6ª, as in the form of the invention first described, but is connected in movable relation thereto, the gear being movably mounted on the end of the shaft, and carrying a spring actuated ratchet dog 30, engaging ratchet teeth 31 on the shaft, in order to permit the worm to be turned independently of the power shaft 6, when for instance the engine is not running.

In the foregoing description and accompanying drawings, I have set forth the invention in the particular detailed form and arrangement of the parts which I prefer to adopt. It will be manifest however, that these details may be variously changed and modified without departing from the spirit of the invention; and it will be understood that the invention is not limited to any particular form and construction of the parts, except in so far as such limitations are specified in the claims.

Having thus described my invention, what I claim is:—

1. Steering mechanism for motor vehicles, comprising two driving gears adapted to be rotated respectively in opposite directions from the motor, a normally inactive rotary member adapted to be operatively connected with the steering ground wheels of the vehicle, clutches for driving said member from the respective gears alternately, and a clutch controlling means adapted to be operated by the steering hand-wheel and operable to either actuate the clutches alternately, or by a quick action, to actuate said rotary member to steer the vehicle independently of said clutches; whereby the steering ground wheels may be turned by the steering hand-wheel when the engine is not running, or when running two slowly to effect a quick turn of the steering wheels.

2. Steering mechanism for motor vehicles comprising two driving gears adapted to be rotated respectively in opposite directions from the motor, a normally inactive rotary member adapted to be operatively connected with the steering ground wheels of the vehicle, clutches for driving said member from the respective gears alternately, and a clutch controlling means adapted to be operated from the steering hand-wheel and including movable members operable either to actuate the clutches alternately, or engageable by a quick action alternately with said rotary member to operate the same independently of the clutches; whereby the steering ground wheels may be turned by the steering hand-wheel when the motor is not running, or when the motor is running too slowly to effect a quick turn of the steering wheels.

3. Steering mechanism as set forth in claim 1, characterized by the fact that a steering post is connected with the steering hand wheel, and the rotary member is in the form of a worm mounted for rotation on said steering post.

4. Steering mechanism as set forth in claim 1, characterized by the fact that a steering post is connected with the steering hand wheel, that the rotary member is in the from of a worm mounted for rotation on the steering post, and that the driving gears are rotatably mounted on the steering post at the ends of the worm.

5. Steering mechanism as set forth in claim 1, characterized by the fact that a steering post is connected with the steering hand wheels, that the rotary member is in the form of a worm mounted for rotation on the steering post, that the driving gears are rotatable on the steering post at the ends of the worm, and that the clutches are located between the ends of the worm and driving gears.

6. Steering mechanism as set forth in claim 1, characterized by the fact that the two driving gears receive their motion from a pinion on a motor-operated driving shaft, and that the said pinion is connected to said shaft in movable relation thereto.

7. Steering mechanism for motor vehicles comprising a steering post, a hand-wheel connected with said post, a worm mounted for rotation on the steering post and formed in its ends with circumferentially extending recesses, driving means rotatable on the steering post at the ends of the worm, a clutch roller located in each recess in the worm and adapted when moved in one direction to wedge against the surrounding gear and connect it to the worm, and when moved in the other direction to disengage the gear, clutch fingers carried by the worm in each recess and spring pressed against the rollers to wedge them against the gears, and fingers carried by the steering post and extending into the respective recesses to move the rollers against the pressure of the springs to disengage them from the gears.

8. Steering mechanism for motor vehicles comprising a steering post, a hand-wheel connected with said post, a worm mounted for rotation on the steering post, two driving gears rotatable on the steering post at the ends of the worm, expansible rings carried by the worm at the opposite ends of the same with said driving gears surrounding said rings respectively, the said rings being normally in contracted condition and adapted when expanded to grip the surrounding gears, rocker levers carried by the worm and engaging the expanding rings to expand the same, and means carried by the steering post for operating said levers and operable to either expand the rings alternately, or by a quick action to actuate the worm manually through the medium of a clutch ring to steer the vehicle independently of the motor; whereby the steering ground wheels may be turned by the steering hand wheel when the engine is not running, or when it is running too slowly to effect a quick turn of the steering wheels.

9. Steering mechanism for motor vehicles comprising a motor operated driving shaft, a pinion connected to the shaft by a pawl and ratchet mechanism, two driving gears adapted to be rotated respectively in opposite directions from said pinion, a normally inactive rotary member adapted to be operatively connected with the steering ground wheels of the vehicle, clutches for driving said member from the respective gears alternately, and a clutch controlling means adapted to be operated by the steering hand wheel and operable to either actuate the clutches alternately, or by a quick action to actuate said rotary member to steer the vehicle independently of the clutching action of said clutches; whereby the steering ground wheels may be turned by the steering hand wheel when the engine is not running, or when running too slowly to effect a quick turn of the steering wheels.

10. Steering mechanism for motor vehicles comprising two driving gears adapted to be rotated respectively in opposite directions from the motor, a normally inactive member operatively connected with the steering wheels of the vehicle, means for driving said member from the respective gears alternately, and a hand-operated controlling mechanism for said means operable either to control said means to steer the vehicle by the motor, or to automatically by a quick action steer the vehicle by hand and independently of the motor; whereby the ground wheels may be turned by hand to steer the vehicle when the engine is not running, or when it is running too slowly to effect a quick turn of the steering wheels.

In testimony whereof, this specification has been duly signed by:

GEORGE A. SWARTZ.